(12) United States Patent
Tang et al.

(10) Patent No.: US 10,614,636 B1
(45) Date of Patent: *Apr. 7, 2020

(54) USING THREE-DIMENSIONAL AUGMENTED REALITY MARKERS FOR LOCAL GEO-POSITIONING IN A COMPUTING ENVIRONMENT

(71) Applicant: Capital One Services, LLC, McLean, VA (US)

(72) Inventors: Qiaochu Tang, The Colony, TX (US); Geoffrey Dagley, McKinney, TX (US); Micah Price, Plano, TX (US); Jason Hoover, Grapevine, TX (US); Stephen Wylie, Carrollton, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/546,282

(22) Filed: Aug. 20, 2019

(51) Int. Cl.
*G06T 19/20* (2011.01)
*G06T 7/70* (2017.01)
(Continued)

(52) U.S. Cl.
CPC .............. *G06T 19/20* (2013.01); *G06T 7/70* (2017.01); *G06T 19/006* (2013.01); *H04W 4/021* (2013.01); *H04W 4/023* (2013.01); *G06T 2207/30204* (2013.01); *G06T 2219/2004* (2013.01)

(58) Field of Classification Search
None
See application file for complete search history.

(56) References Cited

U.S. PATENT DOCUMENTS

2005/0259890 A1\* 11/2005 Lutes ...................... G06T 7/73
382/293
2009/0167867 A1 7/2009 Lin et al.
(Continued)

OTHER PUBLICATIONS

Author unknown, "Toward the indoor use of location-based augmented reality", Study Tour Pixel 2010—University of Twente [online] retrieved on Apr. 16, 2019. Retrieved from Internet URL: https://www.inter-actief.utwente.nl/studiereis/pixel/files/indepth/MattijsUgen.pdf, 7 pages.

(Continued)

*Primary Examiner* — Frank S Chen (57) ABSTRACT

Techniques for providing local geo-positioning using three-dimensional (3D) augmented reality (AR) markers are disclosed. A 3D AR marker located within an occupied space of a user can be displayed on a display of a computing device when the AR marker is within a field of view of the computing device. The 3D AR marker can be identified based on information stored in a storage device of the computing device. Physical attribute information of the 3D AR marker and location information for the 3D AR marker can be retrieved. A distance between the computing device and the 3D AR marker based can be determined based on the physical attribute information. A location of the computing device can then be determined based on the determined distance between the computing device and the 3D AR marker and the location information of the 3D AR marker.

18 Claims, 7 Drawing Sheets

(51) Int. Cl.
*G06T 19/00* (2011.01)
*H04W 4/02* (2018.01)
*H04W 4/021* (2018.01)

(56) References Cited

U.S. PATENT DOCUMENTS

| | | |
|---|---|---|
| 2011/0258176 A1* | 10/2011 | Carver .................. G06F 16/951 |
| | | 707/709 |
| 2015/0326704 A1 | 11/2015 | Ko et al. |
| 2017/0026787 A1 | 1/2017 | Chow et al. |
| 2017/0372593 A1 | 12/2017 | Chadwick et al. |
| 2018/0005446 A1* | 1/2018 | Elazary ................ G06T 19/006 |
| 2018/0290057 A1 | 10/2018 | Mullins |
| 2019/0108683 A1 | 4/2019 | Valli et al. |
| 2019/0171299 A1* | 6/2019 | Sasaki ..................... G06F 3/011 |
| 2019/0294841 A1* | 9/2019 | Hall .................... G06F 16/9554 |

OTHER PUBLICATIONS

Mulloni, A., et al., "Indoor Positioning and Navigation with Camera Phones", IEEE CS Pervasive Computing, 8(2): 22-31 (Apr.-Jun. 2009).

* cited by examiner

Storage Medium 500

Computer Executable Instructions for 400

USING THREE-DIMENSIONAL AUGMENTED REALITY MARKERS FOR LOCAL GEO-POSITIONING IN A COMPUTING ENVIRONMENT

RELATED APPLICATION

This application is related to the United States Patent Application titled "USING AUGMENTED REALITY MARKERS FOR LOCAL POSITIONING IN A COMPUTING ENVIRONMENT," Ser. No. 16/546,286, filed on Aug. 20, 2019, which is hereby incorporated by reference in its entirety.

TECHNICAL FIELD

Embodiments described herein generally relate to geo-positioning.

BACKGROUND

The Global Positioning System (GPS) is often used to provide geo-positioning. When GPS is not available, for example, for many indoor spaces, other conventional location determination systems are employed. These conventional location determination systems often require wireless network connectivity or rely on beacons. However, many spaces that prevent the use of GPS do not provide wireless network connectivity. Additionally, beacon-based location systems require many intricate and costly beacons that are often arranged in a customized manner for a particular space and require complex maintenance. Accordingly, what is needed is a reliable geo-positioning determination system that can determine a user's location and provide navigation services that does not involve beacons and does not necessarily rely on network connectivity.

SUMMARY OF THE DISCLOSURE

This disclosure presents various systems, components, and methods related to providing geo-positioning. Each of the systems, components, and methods disclosed herein provides one or more advantages over conventional systems, components, and methods.

Various embodiments include techniques for providing local geo-positioning using physical three-dimensional (3D) augmented reality (AR) markers. A 3D AR marker located within an occupied space of a user can be displayed on a display of a computing device when the AR marker is within a field of view of the computing device. The 3D AR marker can be identified based on information stored in a storage device of the computing device. Physical attribute information of the 3D AR marker and location information for the 3D AR marker can be retrieved. A distance between the computing device and the 3D AR marker can be determined based on the physical attribute information. A location of the computing device can then be determined based on the determined distance between the computing device and the 3D AR marker and the location information of the 3D AR marker. The computing device can then provide navigation services to the user based on the determined location of the computing device.

3D AR markers can be any physical 3D object. As a result, geo-positioning can be provided without the need for complex and expensive beacons. Further, geo-positioning can be provided without altering a desired space. Other embodiments are also disclosed and described.

DETAILED DESCRIPTION

Figure 1:
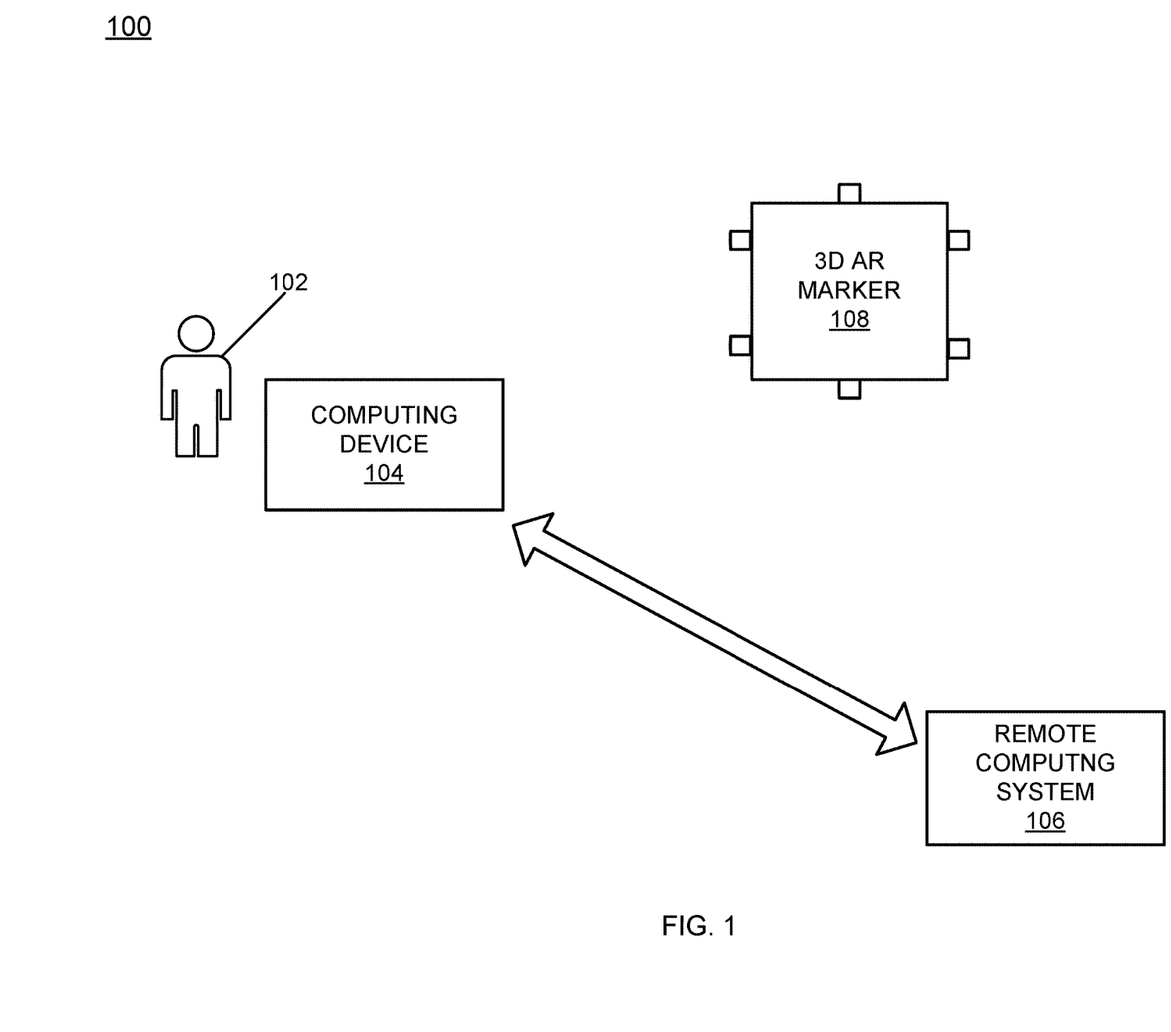
FIG. 1 illustrates an operating environment.

FIG. 1 illustrates an operating environment 100 such as may be representative of various embodiments in which techniques for determining local geo-positioning using three-dimensional (3D) augmented reality (AR) markers are provided. As shown in FIG. 1, the operating environment 100 can include a user 102, a computing device 104, a remote computing system 106, and a 3D AR marker 108.

The operating environment 100 can be any space occupied by the user 102 such as, for example, an indoor space or an outdoor space. In various embodiments, the operating environment 100 can be a building such as for example, an office space, a hotel, a convention center, or a warehouse. In various embodiments, a global positioning system (GPS) is not available within the operating environment 100. In various embodiments, a wireless network such as, for example, any local area network (LAN), any wide area network (WAN), or any cellular network is not available within the operating environment 100 such that wireless transmission or reception of data is not available. In various embodiments, one or more wireless networks may be available in the operating environment 100 such that wireless transmission or reception of data is available.

The computing device 104 can be a local computing device (e.g., relative to the user 102) and can include any type of electronic computing device such as, for example, a desktop, a laptop, a tablet, a notebook, a mobile device, or electronic eyewear. In general, the computing device 104 can be any computing device capable of viewing 3D objects within the operating environment 100. Accordingly, in various embodiments, the computing device 104 can be any electronic device that includes an optical system (e.g., a camera) for receiving optical information (e.g., visual information about a 3D object within the operating environment 100). Further, in various embodiments, the computing device 104 can include a display system (e.g., a monitor, a display, a touchscreen, etc.) for rendering visual information (e.g., a 3D object within the operating environment 100 viewed by the optical system). Additionally, in various embodiments, the computing device 104 can generate and display AR components or information on any display system provided by the computing device 104.

The remote (relative to the user 102) computing system 106 can be any type of computing device including a server or can represent a computer network, a cloud-based computing system, a database, or any other computer networking component and/or electronic computing device or storage device. The remote computing system 106 can communicate with the computing device 104 over any communication medium based on any known communication protocol or standard including, for example, any known wireless LAN standard or protocol.

The 3D AR marker 108 can be any physical 3D object such as, for example, a chair, a vase, or a lamp. The 3D AR marker 108 can have any height or size and can represent or operate as a location anchor. That is, in various embodiments, the location of the 3D AR marker 108 can be known and can be used as a reference point for determining a location of the user 102 and/or the computing device 104. In various embodiments, the 3D AR marker 108 can be of sufficient detail to be distinguished from any other physical 3D object.

In various embodiments, a layout of the operating environment 100 can be pre-stored and/or known to the computing device 104. For example, the layout of the operating environment 100 (e.g., an architectural layout or map of the operating environment 100) can be stored in a memory component of the computing device 104. In various embodiments, the layout of the operating environment 100 can be provided to the computing device 104 from the remote computing system 106.

In various embodiments, information regarding the 3D AR marker 108 can be pre-stored and/or known to the computing device 104. In various embodiments, information regarding the 3D AR marker 108 can be provided to the computing device 104 from the remote computing system 106. Information regarding the 3D AR marker 108 can include, for example, a location of the 3D AR marker 108 or any physical attribute of the 3D AR marker 108. The location of the 3D AR marker 108 can include an absolute geo-position of the 3D AR marker 108 (e.g., including a latitude and a longitude or a GPS position) or can include a position relative to any feature within or relative to any portion of the operating environment 100. Physical attributes of the 3D AR marker 108 can include any dimensional information regarding the 3D AR marker 108 (e.g., a height, width, size, shape, profile, etc.). Physical attributes of the 3D AR marker 108 can also include information regarding any color, pattern, or physical feature of the 3D AR marker 108. In various embodiments, the 3D AR marker 108 can be flagged or labeled as operating as a location anchor (e.g., a sign can be placed on the 3D AR marker 108).

In various embodiments, a location of the user 102 and/or the computing device 104 can be unknown. The location of the user 102 and the computing device 104 are used interchangeably herein without intent to limit as the user 102 is generally in close proximity to the computing device 104—for example, the user 102 may either be holding or wearing the computing device 104. To determine the location of the user 102/computing device 104, the 3D AR marker 108 can first be located—i.e., found or viewed through the computing device 104 (e.g., within a field of view of an optical system of the computing device 104). Once the 3D AR marker 108 is found, an exact location of the 3D AR marker can be determined. Based on attributes of the 3D AR marker 108, a distance from the user 102 to the 3D AR marker 108 can be determined. Based on the determined distance to the 3D AR marker 108 having a known location, an exact location of the user 102 can be determined. The exact location of the user 102 can include an absolute geo-position of the user 102 (e.g., including a latitude and a longitude or a GPS position) or can include a position relative to any feature within or relative to any portion of the operating environment 100. After determining the location of the user 102, the computing device 104 can route the user 102 to a desired location within the operating environment 100 (e.g., to a meeting room within a hotel) or can route another individual within the operating environment 100 to the user 102 (e.g., to enable an acquaintance to find the user 102).

In various embodiments, once the location of the user 102 is determined, the computing device 104 can provide any type of visual information (e.g., graphical and/or textual information) on a display to navigate the user 102 to a desired location. As an example, the computing device 104 can provide an arrow (e.g., an AR indicator) on the display pointing to a direction of travel to initiate navigation toward a desired location. As another example, the computing device 104 can provide a map of the operating environment 100 with an indication on the map of where the user 102 is located, where the desired location is positioned, and/or a route (visual and/or textual) for reaching the desired location. The computing device 104 can determine the location of the 3D AR marker 108, can determine the location of the user 102 in reference to the 3D AR marker 108, and can route the user 102 to any other desired location within the operating environment 100 in a variety of manners as described herein.

In various embodiments, as the user 102 wanders or moves around the operating environment 100, the user 102 can observe the operating environment 100 and objects within the operating environment 100 through a display system of the computing device 104. The display system of the computing device 104 can provide a visual rendering of any viewed object within the operating environment 100. In doing so, the display system of the computing device 104 can display the 3D AR marker 108 when the 3D AR marker 108 is within a field of view of the optical system of the computing device 104.

In various embodiments, the user 102 may be aware of what objects in the operating environment 100 may be designated as or may operate as location anchors. For example, the user 102 may be aware that the 3D AR marker 108 is indeed a 3D AR marker/location anchor. In various other embodiments, the user 102 may not be aware as such. Accordingly, the computing device 104 may use object detection or some other object or feature recognition technique to identify the 3D AR marker 108. For example, the viewed 3D AR marker 108 can be compared to one or more stored AR markers to determine if the viewed 3D AR marker 108 matches a known AR marker. The comparison can be made based on one or more physical attributes between the viewed 3D AR marker 108 and the one or more stored AR markers.

Under either scenario, the 3D AR marker 108 can be identified within the operating environment 100—either automatically by the computing device 104 (e.g., by automatic visual detection) or by the user 102. If the user 102 identifies the 3D AR marker 108, then the user 102 can indicate to the computing device 104 that the 3D AR marker 108 has been identified (e.g., by providing such an indication when the 3D AR marker 108 is within the field of view of the computing device 104). For example, the user 102 can indicate through a user interface of the computing device 104 (e.g., a voice or touch-based user interface) that a viewed object is a 3D AR marker. In various embodiments, the 3D AR marker 108 can be viewed on a display of the computing device 104 and the user 102 can touch the rendering of the 3D AR marker 108 on a touchscreen to indicate the rendered object is an AR marker.

After identifying the 3D AR marker 108, physical attribute information and/or location information regarding the 3D AR marker 108 can be retrieved—for example, either from local memory storage of the computing device 104 or from the remote computing system 106.

The attribute information regarding the 3D AR marker 108 can be used to determine a distance from the user 102 to the 3D AR marker 108. For example, one or more features of the 3D AR marker 108 can be used to determine a rotational position of the user 102 relative to the one or more features and/or a distance to the 3D AR marker 108 can be determined. After determining a position of the user 102 relative to the 3D AR marker 108, an exact location of the user 102 can be determined based on the known exact location of the 3D AR marker 108.

In various embodiments, when the computing device 104 provides an AR framework (e.g., an ability to view 3D objects within the operating environment 100) and identifies the 3D AR marker 108 in its field of view, the computing device 104 can determine a size and a rotation of 3D AR marker 108. Given information regarding physical attributes of the 3D AR marker 108, the distance to the 3D AR marker 108 can be determined. A variety of factors can be used to do so that can vary based on the distance determination technique employed and can include, for example, an angle of rotation from the 3D AR marker 108, a size difference between the perceived size of the 3D AR marker 108 and the actual size of the 3D AR marker 108, a degree of rotation of the computing device 104, a height or altitude of the computing device 104, etc.

Information can then be provided to the user 102 through the computing device 104 to route the user 102 to a desired location as indicated by the user. For example, the display system of the computing device 104 can display a virtual icon, mark, or other graphical feature that indicates a direction of travel towards the desired destination based on the determined location of the user 102. In this way, a user 102 can locate any space, room, object, or individual located in the operating environment 100 that has a known location. Further, the displayed indicator can be updated (e.g., a virtual arrow can be rotated) to dynamically update an indicated direction of travel to reach the desired destination as the user 102 traverses a route to the desired destination. Alternatively, another individual can be guided to the user 102.

In various embodiments, features of the 3D AR marker 108—for example, physical attributes of the 3D AR marker 108—can be pre-scanned or pre-planned and stored and made available to the computing device 104 (e.g., stored in a memory component of the computing device 104).

In various embodiments, the computing device 104 can include a gyroscope, an accelerometer, or another device to detect changes in position, rotation, and/or height of the computing device 104 to facilitate determination of a distance between the user 102/computing device 104 and the 3D AR marker 108. In various embodiments, the computing device 104 can include an infrared sensor or other sensor to determine a distance between the user 102/computing device 104 and the 3D AR marker 108. In various embodiments, a gyroscope and/or accelerometer could facilitate determining orientation of a camera of the computing device 104 while looking at the AR marker 108, or could also be used to track a position of the computing device 104 if the camera loses sight of all AR markers.

The techniques disclosed herein for providing local geo-positioning using 3D AR markers enables the user 102 to orient a user's device (e.g., the computing device 104). The techniques disclosed herein enable pre-positioned 3D AR markers to orient the user 102 in situations where GPS or other positioning mechanisms or technologies are not available.

The techniques disclosed herein provide numerous advantages over using conventional location beacons. First, conventional location beacons require a power source and are often battery powered. Second, an indoor positioning system that relies on conventional location beacons typically requires a complex mesh of beacons placed at equal distance intervals. In turn, such a system is often required to be custom built to fit a particular building. As such, a mesh system of conventional location beacons is expensive to design, build, and maintain.

In contrast, the techniques disclosed herein can leverage any existing 3D object to be a 3D AR marker. The 3D AR markers do not require a power source and can serve other roles within a building space (e.g., as furniture, artwork, any object already existing in the space, etc.). As a result, the techniques disclosed herein significantly reduce both a complexity and the cost of providing a location system.

Figure 2:
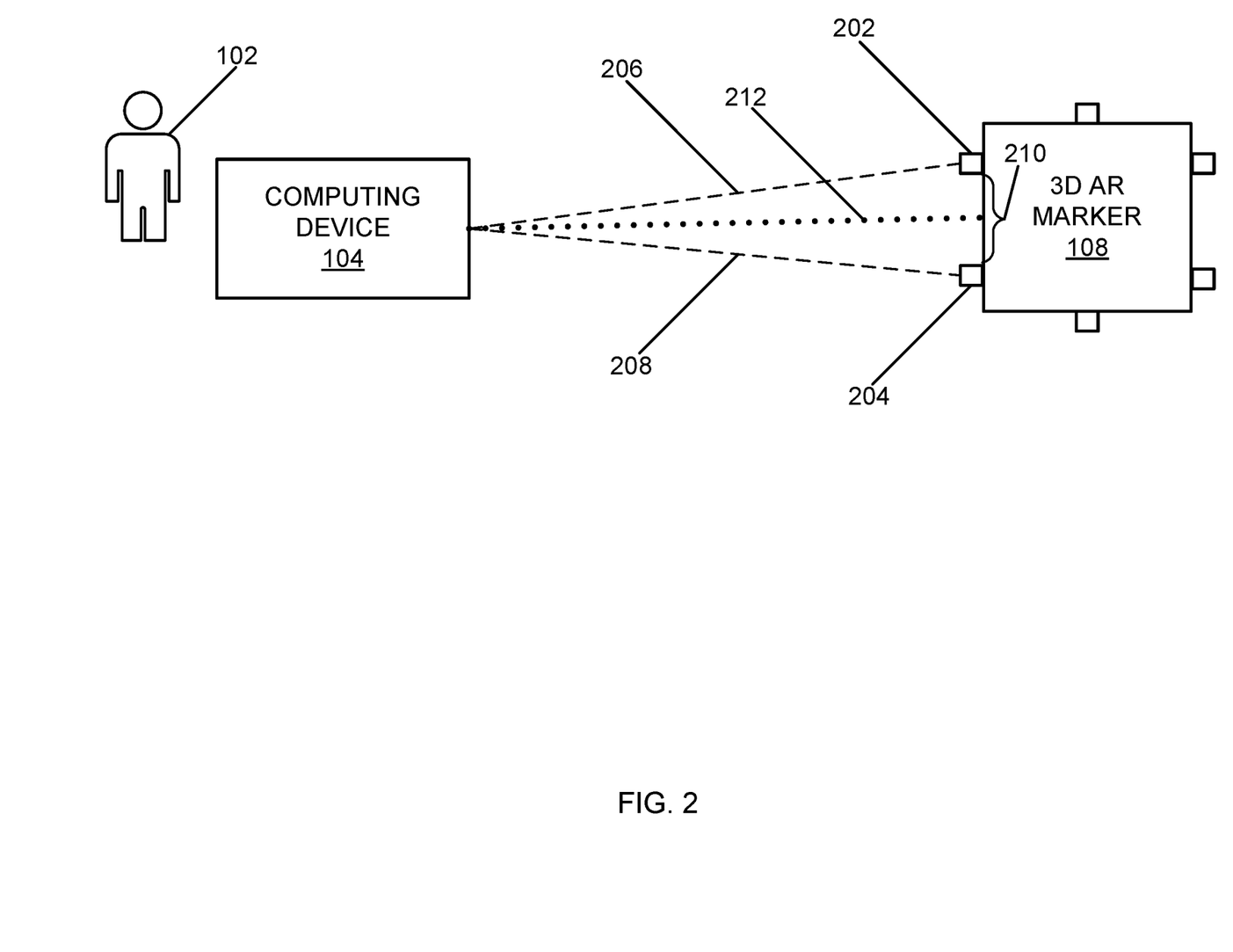
FIG. 2 illustrates an overview of a first technique for determining a distance between a computing device and a three-dimensional (3D) augmented reality (AR) marker depicted in FIG. 1.

FIG. 2 illustrates an overview of a first technique for determining a distance between the computing device 104 and the 3D AR marker 108. As shown in FIG. 2, the 3D AR marker 108 can include a first feature object or point 202 and a second feature object or point 204. The optical system of the computing device 104 can view the first feature point 202 through a first line of sight (LOS) 206 and can view the second feature point through a second LOS 208. A distance 210 between the first and second feature points 202 and 204 can be known—for example, stored in a memory component of the computing device 104. Based on viewing the first and second feature points 202 and 204 through the first and second LOSs 206 and 208, respectively, and based on the distance 210, a distance 212 between the computing device 104 (and by proxy the user 102) and the 3D AR marker 108 can be determined by techniques such as photogrammetry, or minimization of a least-squares distance between salient feature points in an image and salient feature points in a representation such as a CAD model of the 3D AR marker 108, or using a machine learning model to predict distance and orientation relative to the 3D AR marker 108, or other techniques as will be appreciated by one of ordinary skill in the relevant art. Further, the distance 212 can be determined based on additional information as disclosed herein including a known height, shape, or size of the 3D AR marker 108, differences in the actual size of the 3D AR marker 108 and the size of the 3D AR marker 108 when viewed through the computing device 104, a height and/or rotation of the computing device 104, a defined field of view or resolution of the camera of computing device 104, and/or other factors as will be appreciated by one of ordinary skill in the relevant art.

Figure 3:
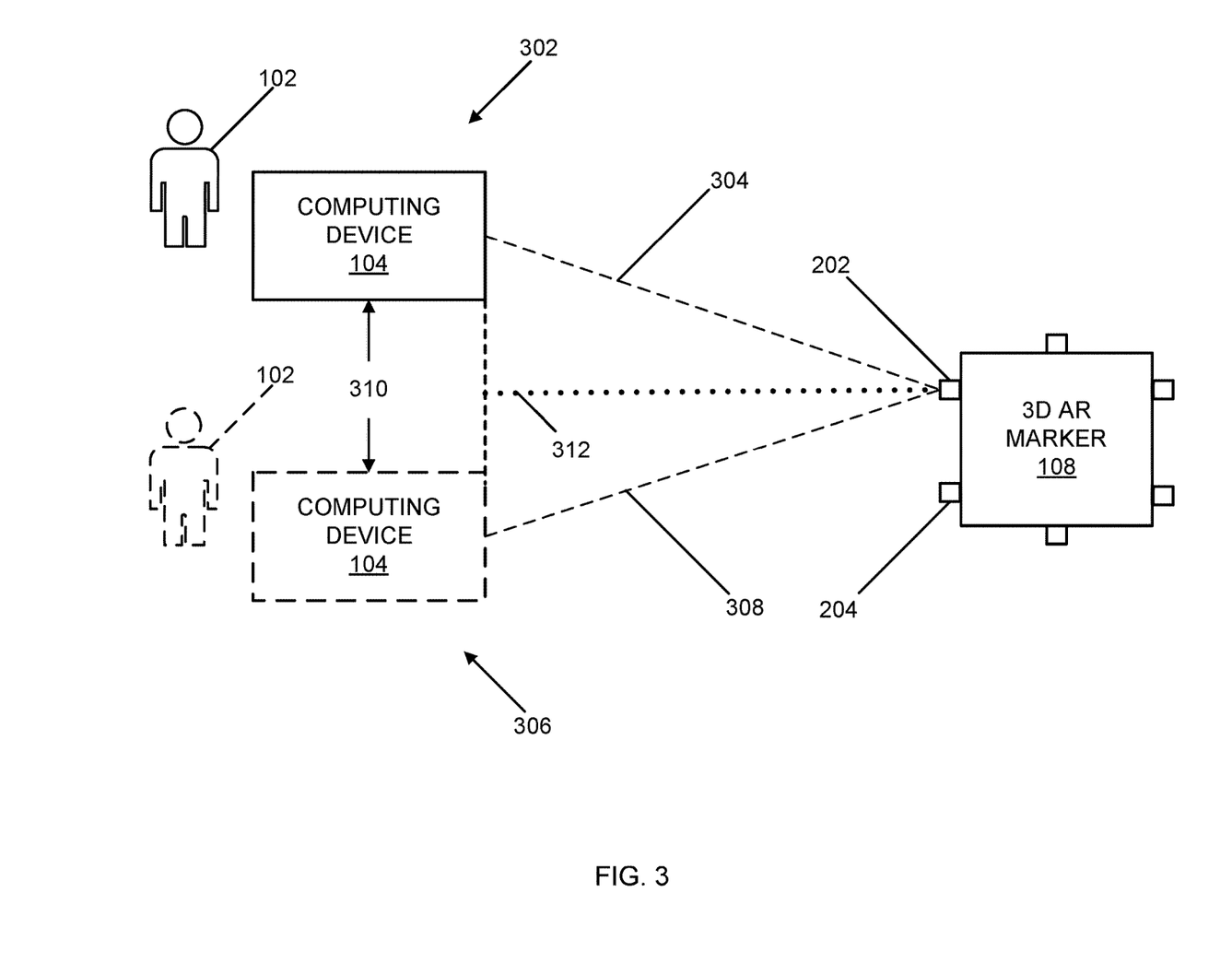
FIG. 3 illustrates an overview of a second technique for determining a distance between the computing device and the 3D AR marker depicted in FIG. 1.

FIG. 3 illustrates an overview of a second technique for determining a distance between the computing device 104 and the 3D AR marker 108. As shown in FIG. 3, the computing device 104 can view the first feature point 202 at a first location 302 through a first LOS 304 and can view the first feature point 202 at a second location 306 through a second LOS 308 (with the computing device 104 and the user 102 each shown in phantom at the second location 306). A distance 310 between the first and second locations 302 and 306 can be known—for example, stored in a memory component of the computing device 104. Based on viewing the first feature point 202 through the first and second LOSs 304 and 308 at the first and second locations 302 and 306, respectively, and based on the distance 310, a distance 312 between the computing device 104 (and by proxy the user 102) and the 3D AR marker 108 can be determined as will be appreciated by one of ordinary skill in the relevant art. The distance 312 can be from the 3D AR marker 108 to a point between the first and second locations 302 and 306. Further, the distance 312 can be determined based on additional information as disclosed herein including a known height, shape, or size of the 3D AR marker 108, differences in the actual size of the 3D AR marker 108 and the size of the 3D AR marker 108 when viewed through the computing device 104, a height and/or rotation of the computing device 104, and other factors as will be appreciated by one of ordinary skill in the relevant art.

Figure 4:
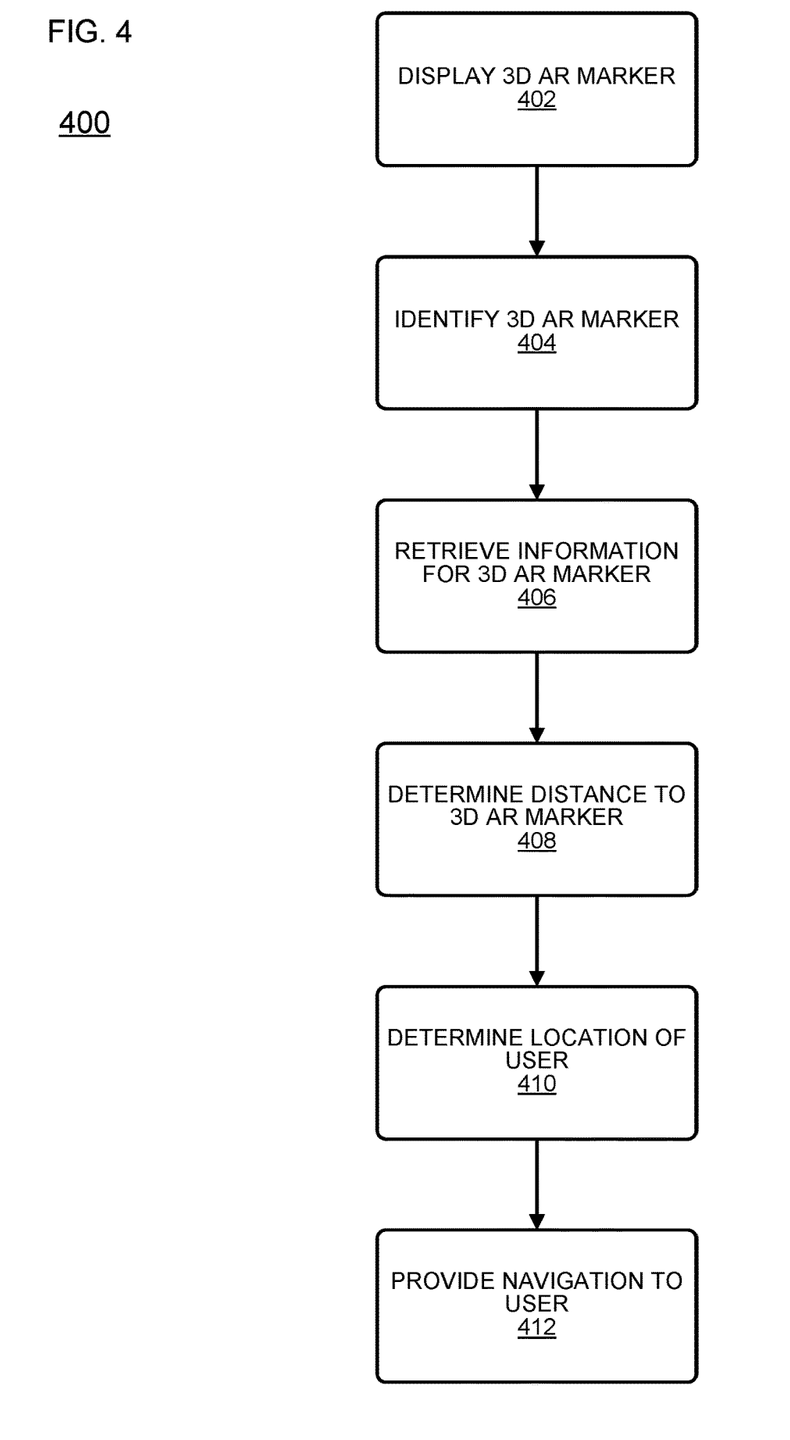
FIG. 4 illustrates a logic flow.

FIG. 4 illustrates an example of a logic flow 400 that may be representative of techniques for providing local geo-positioning using 3D AR markers. For example, the logic flow 400 may be representative of operations that may be performed in various embodiments by any constituent component of the operating environment 100 (e.g., the computing device 104) depicted in FIG. 1.

At 402, a 3D AR marker located within an occupied space of a user can be displayed on a display of a computing device when the AR marker is within a field of view of the computing device.

At 404, the 3D AR marker can be identified and/or recognized. The 3D AR marker can be recognized based on a label or other visual indicator outside of the 3D AR marker itself—for example, by a sign on or near the 3D AR marker indicating it is a 3D AR marker and/or through an indication provided by a user. The 3D AR marker can also be recognized automatically by visual detection techniques implemented by the computing device based on information stored in a storage device of the computing device 104. For example, known features of a stored 3D AR marker can be compared to an object within the field of the view of the computing device 104. Based on a comparison between the viewed object and the stored information, a determination can be made that the viewed 3D object is a designated 3D AR marker.

At 406, physical attribute information for the 3D AR marker can be retrieved. The physical attribute information can be stored locally in the storage device of the computing device 104 or can be received from a remote computing system (e.g., the remote computing system 106). Location information for the 3D AR marker can also be retrieved. The location information can be stored locally in the storage device of the computing device 104 or can be received from a remote computing system (e.g., the remote computing system 106). The location information can be any location information for precisely placing the 3D AR marker such as latitude and longitude information, or location information relative to a space occupied by the 3D AR marker (e.g., relative to a building in which the 3D AR marker is positioned).

At 408, a distance between the computing device and the 3D AR marker can be determined based on the physical attribute information of the 3D AR marker. As disclosed herein, a variety of distance determination techniques can be used to determine this distance as will be appreciated by one of ordinary skill in the relevant art.

At 410, a location of the computing device and/or user of the computing device can be determined based on the determined distance between the computing device and the AR marker and the location information of the AR marker.

At 412, the location of the computing device and/or the user of the computing device can be used to guide or navigate the user. For example, the location of the computing device and/or the user of the computing device can be used to route or direct the user to a desired location or can be used to route or direct another individual to the user. In various embodiments, as described herein, the logic flow 400 and/or the techniques for providing local geo-positioning using 3D AR markers described herein can be provided without any available wireless or wired network. In various embodiments, once the location of the computing device and/or the user of the computing device is determined, this location information can be distributed or provided to other computing devices or computing systems.

Figure 5:
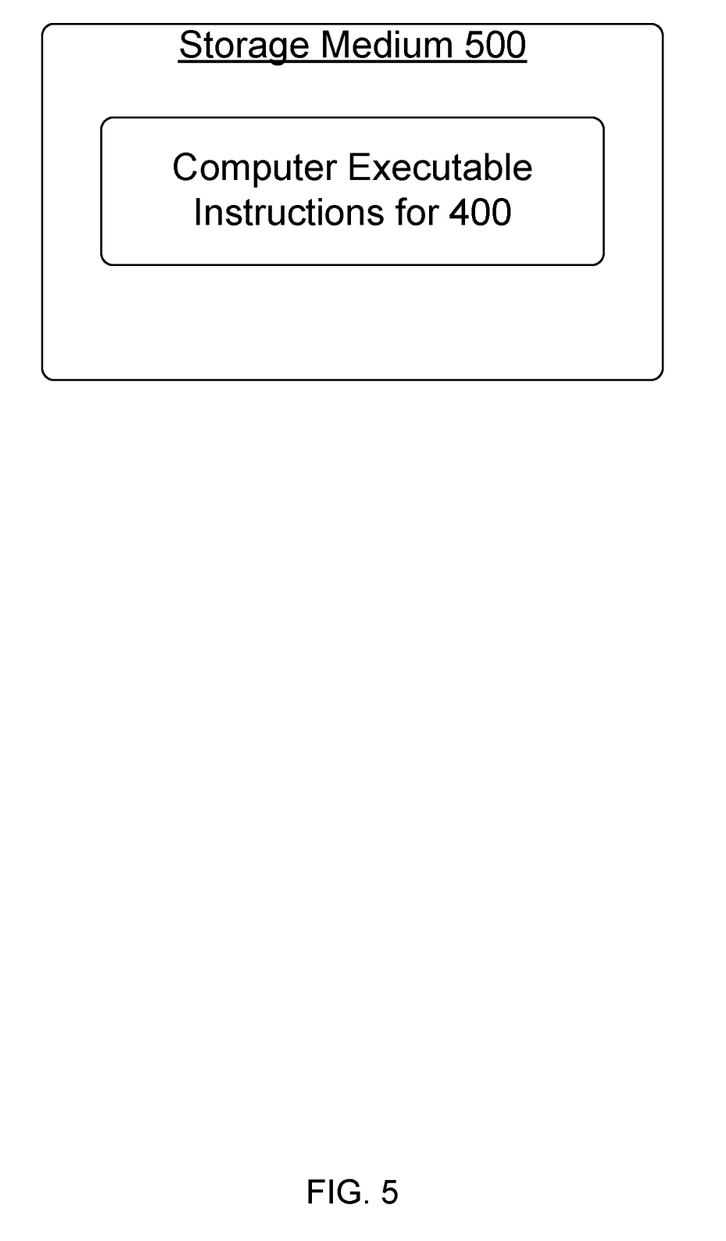
FIG. 5 illustrates a storage medium.

FIG. 5 illustrates a storage medium 500. Storage medium 500 may represent an implementation of a storage device of any computing device that may operate within the operating environment 100 of FIG. 1 (e.g., the computing device 104). The storage medium 500 can comprise any non-transitory computer-readable storage medium or machine-readable storage medium. In various embodiments, the storage medium 500 can comprise a physical article of manufacture. In various embodiments, storage medium 500 can store computer-executable instructions, such as computer-executable instructions to implement one or more of logic flows or operations described herein, such as the logic flow 400 of FIG. 4. In various embodiments, storage medium 500 can store computer-executable instructions, such as computer-executable instructions to implement any of the functionality described herein in relation to any described device, system, or apparatus. Examples of a computer-readable storage medium or machine-readable storage medium can include any tangible media capable of storing electronic data. Examples of computer-executable instructions can include any type of computer readable code.

Figure 6:
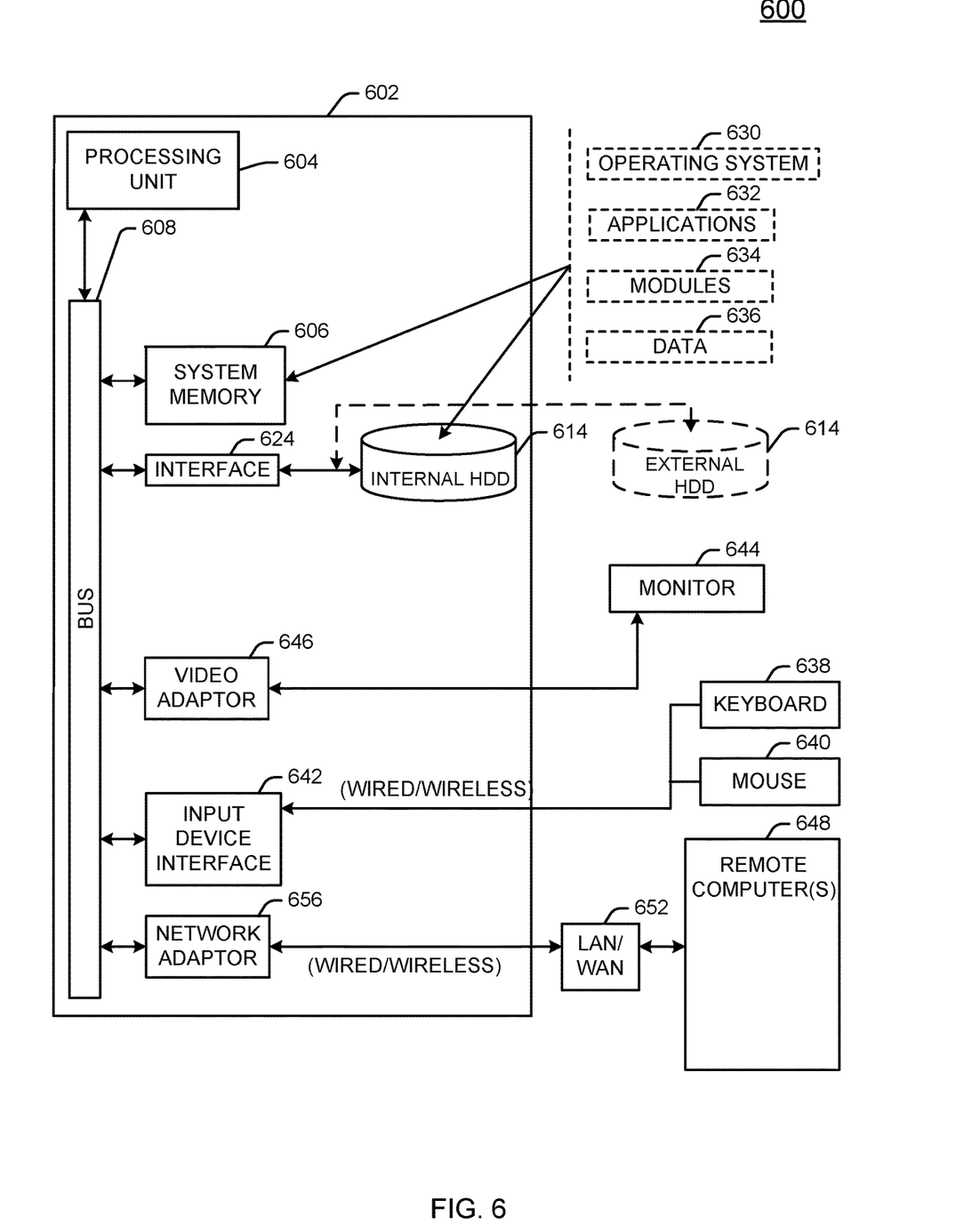
FIG. 6 illustrates a computing architecture.

FIG. 6 illustrates a computing architecture 600 that can implement various embodiments described herein. In various embodiments, the computing architecture 600 can comprise or be implemented as part of an electronic device and/or a computing device. In various embodiments, the computing architecture 600 can represent an implementation of any constituent component of the operating environment 100 depicted in FIG. 1. One or more of the constituent components of the computing architecture 600, and/or any constituent component of the operating environment 100, can be implemented in hardware, software, or any combination thereof including implementation based on a storage device (e.g., a memory unit) and logic, at least a portion of which is implemented in circuitry and coupled to the storage device. The logic can be or can include a processor or controller component such as, for example, a processor or controller that executes code stored in the storage device.

The computing architecture 600 can include various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth.

As shown in FIG. 6, the computing architecture 600 can comprise a computer 602 having a processing unit 604, a system memory 606 and a system bus 608. The processing unit 604 can be any of various commercially available processors or can be a specially designed processor.

The system bus 608 provides an interface for system components including, but not limited to, an interface between the system memory 606 and the processing unit 604. The system bus 608 can be any of several types of bus structure that may further interconnect to a memory bus (with or without a memory controller), a peripheral bus, and a local bus using any of a variety of commercially available bus architectures.

The system memory 606 can include any type of computer-readable storage media including any type of volatile and non-volatile memory. The computer 602 can include any type of computer-readable storage media including an internal (or external) hard disk drive (HDD) 614. In various embodiments, the computer 602 can include any other type of disk drive such as, for example, a magnetic floppy disk and/or an optical disk drive. The HDD 614 can be connected to the system bus 608 by a HDD interface 624.

In various embodiments, any number of program modules can be stored in the drives and memory units 606 and/or 614 such as, for example, an operating system 630, one or more application programs 632, other program modules 634, and program data 636.

A user can enter commands and information into the computer 602 through one or more wired/wireless input devices such as for example, a keyboard 638 and a pointing device, such as a mouse 640. These and other input devices can be connected to the processing unit 604 through an input device interface 642 that is coupled to the system bus 608. A monitor 644 or other type of display device can also be connected to the system bus 608 via an interface, such as a video adaptor 646. The monitor 644 may be internal or external to the computer 602.

The computer 602 may operate in a networked environment using logical connections via wired and/or wireless communications to one or more remote computers, such as a remote computer 648. The remote computer 648 can be a workstation, a server computer, a router, a personal computer, portable computer, microprocessor-based entertainment appliance, a smartphone, a tablet, a peer device or other common network node, and typically includes many or all of the elements described relative to the computer 602. The logical connections depicted include wired and/or wireless connectivity to networks 652 such as, for example, a local area network (LAN) and/or larger networks, for example, a wide area network (WAN). Networks 652 can provide connectivity to a global communications network such as, for example, the Internet. A network adapter 656 can facilitate wired and/or wireless communications to the networks 652. The computer 602 is operable to communicate over any known wired or wireless communication technology, standard, or protocol according to any known computer networking technology, standard, or protocol.

Figure 7:
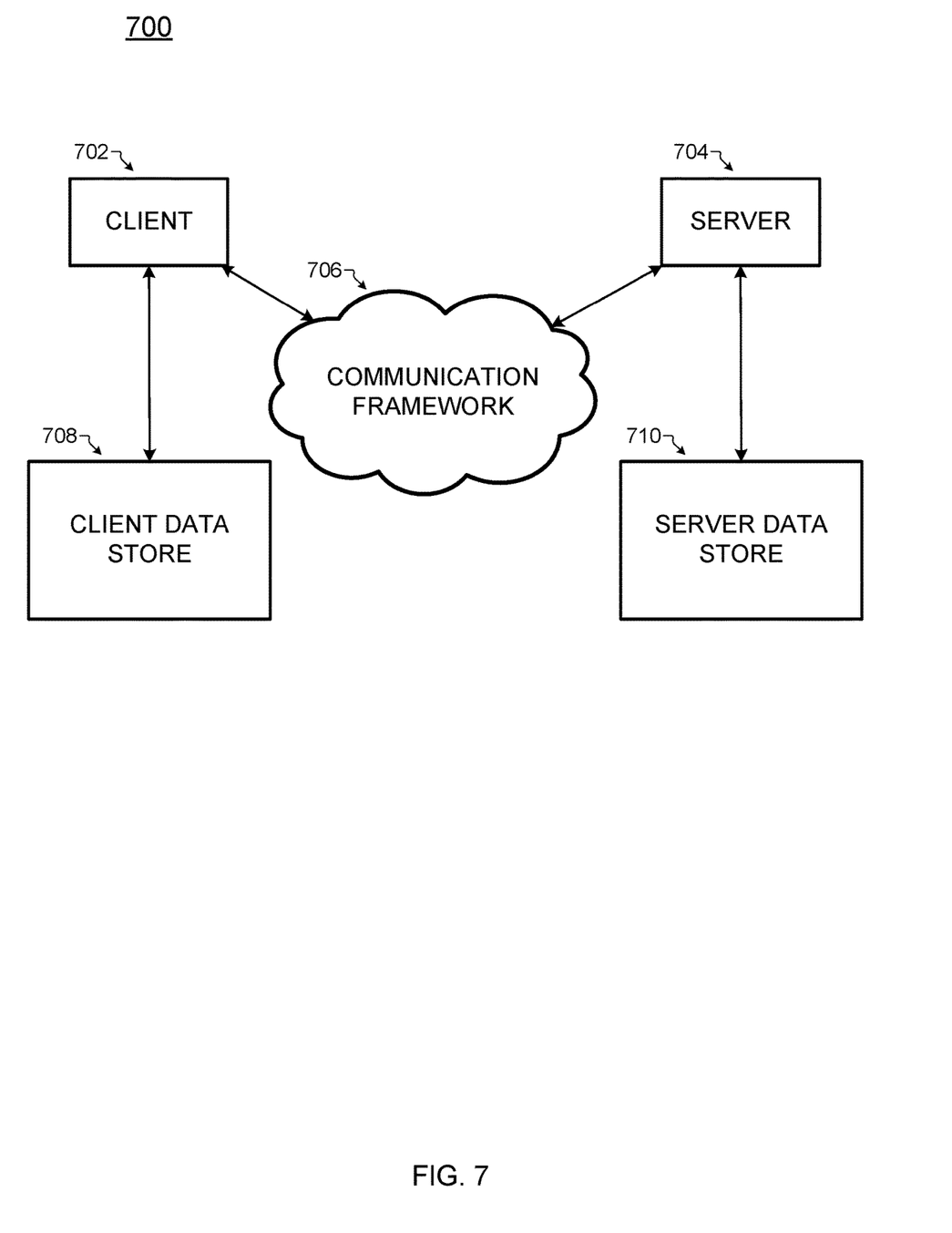
FIG. 7 illustrates a communication architecture.

FIG. 7 illustrates a block diagram of a communication architecture 700. The communication architecture 700 can implement various embodiments described herein. As shown in FIG. 7, the communication architecture 700 comprises one or more clients 702 and servers 704. One of the clients 702 and/or one of the servers 704 can represent any constituent component of the operating environment 100 depicted in FIG. 1.

The client 702 and the server 704 can be operatively connected to a client data store 708 and a server data store 710, respectively, that can be employed to store information local to the respective client 702 and server 704. In various embodiments, the client 702 and/or the server 704 can implement one or more of logic flows or operations described herein.

The client 702 and the server 704 can communicate data or other information between each other using a communication framework 706. The communications framework 706 can implement any known communications technique or protocol. The communications framework 706 can be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators), or any combination thereof. The communications framework 706 can operate over any communication media according to any networking technology including any wired or wireless communications standard or protocol, or any combination thereof.

The following set of examples pertain to further embodiments.

Example 1 is a computing device comprising a storage device, a display, and logic, at least a portion of the logic implemented in circuitry coupled to the storage device and the display, the logic to display on the display an augmented reality marker located within an occupied space of a user when the augmented reality marker is within a field of view of the computing device, identify the augmented reality marker based on augmented reality marker information stored in the storage device, retrieve physical attribute information of the augmented reality marker stored in the storage device, retrieve location information of the augmented reality marker stored in the storage device, determine a distance between the computing device and the augmented reality marker based on the physical attribute information of the augmented reality marker, determine a location of the computing device based on the distance between the computing device and the augmented reality marker and the location information of the augmented reality marker, and display on the display a virtual marker indicating a direction of travel towards a desired destination indicated by the user based on the location of the computing device.

Example 2 is an extension of Example 1 or any other example disclosed herein, the logic to dynamically update the display of the virtual marker indicating the direction of travel towards the desired destination indicated by the user as the user travels towards the desired destination.

Example 3 is an extension of Example 1 or any other example disclosed herein, the logic to determine the distance between the computing device and the augmented reality marker based on a first feature point of the augmented reality marker, a second feature point of the augmented reality marker, and a distance between the first and second feature points of the augmented reality marker stored in the storage device.

Example 4 is an extension of Example 1 or any other example disclosed herein, the logic to determine the distance between the computing device and the augmented reality marker based on a feature point of the augmented reality marker viewed by the computing device at a first location of the computing device and viewed at a second location of the computing device and a determined distance between the first and second locations of the computing device.

Example 5 is an extension of Example 4 or any other example disclosed herein, further comprising at least one of an accelerometer and a gyroscope, wherein the determined distance between the first and second locations of the computing device is determined by the at least one of the accelerometer and the gyroscope.

Example 6 is an extension of Example 1 or any other example disclosed herein, the logic to receive the physical attribute information of the augmented reality marker and the location information of the augmented reality marker from a remote computing device.

Example 7 is an extension of Example 6 or any other example disclosed herein, the logic to transmit the location of the computing device to the remote computing device.

Example 8 is an extension of Example 1 or any other example disclosed herein, the location of the computing device to comprise a latitude and a longitude of the computing device.

Example 9 is an extension of Example 1 or any other example disclosed herein, the location of the computing device to comprise a location of the computing device relative to physical dimensions of the occupied space of the user, the physical dimensions of the occupied space of the user stored in the storage device.

Example 10 is a method comprising displaying on a display of a computing device an augmented reality marker located within an occupied space of a user when the augmented reality marker is within a field of view of the computing device, retrieving physical attribute information of the augmented reality marker stored in a storage device of the computing device, retrieving location information of the augmented reality marker stored in the storage device, determining a distance between the computing device and the augmented reality marker based on the physical attribute information of the augmented reality marker, determining a location of the computing device based on the distance between the computing device and the augmented reality marker and the location information of the augmented reality marker, and displaying on the display a virtual marker indicating a direction of travel towards a desired destination indicated by the user based on the location of the computing device.

Example 11 is an extension of Example 10 or any other example disclosed herein, further comprising dynamically updating the display of the virtual marker indicating the direction of travel towards the desired destination indicated by the user as the user travels towards the desired destination.

Example 12 is an extension of Example 10 or any other example disclosed herein, further comprising determining the distance between the computing device and the augmented reality marker based on a first feature point of the augmented reality marker, a second feature point of the augmented reality marker, and a distance between the first and second feature points of the augmented reality marker stored in the storage device.

Example 13 is an extension of Example 10 or any other example disclosed herein, further comprising determining the distance between the computing device and the augmented reality marker based on a feature point of the augmented reality marker viewed by the computing device at a first location of the computing device and viewed at a second location of the computing device and a determined distance between the first and second locations of the computing device.

Example 14 is an extension of Example 10 or any other example disclosed herein, further comprising receiving the physical attribute information of the augmented reality marker and the location information of the augmented reality marker from a remote computing device over a wireless local area network (LAN).

Example 15 is an extension of Example 14 or any other example disclosed herein, further comprising reporting the location of the computing device to the remote computing device over the wireless LAN.

Example 16 is an extension of Example 15 or any other example disclosed herein, the location of the computing device to comprise a latitude and a longitude of the computing device.

Example 17 is at least one non-transitory computer-readable medium comprising a set of instructions that, in response to being executed on a computing device, cause the computing device to display on a display of the computing device an augmented reality marker located within an occupied space of a user when the augmented reality marker is within a field of view of the computing device, identify the augmented reality marker based on augmented reality marker information stored in a storage device of the computing device, retrieve physical attribute information of the augmented reality marker stored in the storage device, retrieve location information of the augmented reality marker stored in the storage device, determine a distance between the computing device and the augmented reality marker based on the physical attribute information of the augmented reality marker, determine a location of the computing device based on the distance between the computing device and the augmented reality marker and the location information of the augmented reality marker, and display on the display a virtual marker indicating a direction of travel towards a desired destination indicated by the user based on the location of the computing device.

Example 18 is an extension of Example 17 or any other example disclosed herein, the computing device to dynamically update the display of the virtual marker indicating the direction of travel towards the desired destination indicated by the user as the user travels towards the desired destination.

Example 19 is an extension of Example 17 or any other example disclosed herein, the computing device to receive the physical attribute information of the augmented reality marker and the location information of the augmented reality marker from a remote computing device over a wireless local area network (LAN).

Example 20 is an extension of Example 17 or any other example disclosed herein, the location of the computing device to comprise a location of the computing device relative to physical dimensions of the occupied space of the user, the physical dimensions of the occupied space of the user stored in the storage device.

Various embodiments described herein may comprise one or more elements. An element may comprise any structure arranged to perform certain operations. Each element may be implemented as hardware, software, or any combination thereof. Any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

In various instances, for simplicity, well-known operations, components, and circuits have not been described in detail so as not to obscure the embodiments. It can be appreciated that the specific structural and functional details disclosed herein may be representative and do not necessarily limit the scope of the embodiments.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention.

In fact, variations, modifications, and other implementations of what was described herein will occur to those of ordinary skill in the art without departing from the spirit and the scope of the invention. As such, the invention is not to be defined only by the preceding illustrative description.

The invention claimed is:

1. A computing device, comprising:
   a storage device;
   a display; and
   logic, at least a portion of the logic implemented in circuitry coupled to the storage device and the display, the logic to:
   display on the display a three-dimensional augmented reality marker located within an occupied space of a user when the three-dimensional augmented reality marker is within a field of view of the computing device;
   identify the three-dimensional augmented reality marker based on augmented reality marker information stored in the storage device;
   retrieve physical attribute information of the three-dimensional augmented reality marker stored in the storage device, the physical attribute information comprising information regarding a feature point of the three-dimensional augmented reality marker;
   retrieve location information of the three-dimensional augmented reality marker stored in the storage device;
   determine a distance between the computing device and the three-dimensional augmented reality marker based on the physical attribute information of the three-dimensional augmented reality marker, the feature point viewed by the computing device at a first location of the computing device and viewed at a second location of the computing device, and a determined distance between the first and second locations of the computing device;
   determine a location of the computing device based on the distance between the computing device and the three-dimensional augmented reality marker and the location information of the augmented reality marker; and
   display on the display a virtual marker indicating a direction of travel towards a desired destination indicated by the user based on the location of the computing device.

2. The computing device of claim 1, the logic to dynamically update the display of the virtual marker indicating the direction of travel towards the desired destination indicated by the user as the user travels towards the desired destination.

3. The computing device of claim 1, the logic to determine the distance between the computing device and the three-dimensional augmented reality marker based on a first feature point of the three-dimensional augmented reality marker, a second feature point of the three-dimensional augmented reality marker, and a distance between the first and second feature points of the three-dimensional augmented reality marker stored in the storage device.

4. The computing device of claim 1, further comprising at least one of an accelerometer and a gyroscope, wherein the determined distance between the first and second locations of the computing device is determined by the at least one of the accelerometer and the gyroscope.

5. The computing device of claim 1, the logic to receive the physical attribute information of the three-dimensional augmented reality marker and the location information of the three-dimensional augmented reality marker from a remote computing device.

6. The computing device of claim 5, the logic to transmit the location of the computing device to the remote computing device.

7. The computing device of claim 1, the location of the computing device to comprise a latitude and a longitude of the computing device.

8. The computing device of claim 1, the location of the computing device to comprise a location of the computing device relative to physical dimensions of the occupied space of the user, the physical dimensions of the occupied space of the user stored in the storage device.

9. A method, comprising:
   displaying on a display of a computing device an augmented reality marker located within an occupied space of a user when the augmented reality marker is within a field of view of the computing device;
   retrieving physical attribute information of the augmented reality marker stored in a storage device of the computing device;
   retrieving location information of the augmented reality marker stored in the storage device;
   determining a distance between the computing device and the augmented reality marker based on the physical attribute information of the augmented reality marker, the physical attribute information comprising a first feature point of the augmented reality marker, a second feature point of the augmented reality marker, and a distance between the first and second feature points of the augmented reality marker;
   determining a location of the computing device based on the distance between the computing device and the augmented reality marker and the location information of the augmented reality marker; and
   displaying on the display a virtual marker indicating a direction of travel towards a desired destination indicated by the user based on the location of the computing device.

10. The method of claim 9, further comprising dynamically updating the display of the virtual marker indicating the direction of travel towards the desired destination indicated by the user as the user travels towards the desired destination.

11. The method of claim 9, further comprising determining the distance between the computing device and the augmented reality marker based on a feature point of the augmented reality marker viewed by the computing device at a first location of the computing device and viewed at a second location of the computing device and a determined distance between the first and second locations of the computing device.

12. The method of claim 9, further comprising receiving the physical attribute information of the augmented reality marker and the location information of the augmented reality marker from a remote computing device over a wireless local area network (LAN).

13. The method of claim 12, further comprising reporting the location of the computing device to the remote computing device over the wireless LAN.

14. The method of claim 13, the location of the computing device to comprise a latitude and a longitude of the computing device.

15. At least one non-transitory computer-readable medium comprising a set of instructions that, in response to being executed on a computing device, cause the computing device to:
- display on a display of the computing device an augmented reality marker located within an occupied space of a user when the augmented reality marker is within a field of view of the computing device;
- identify the augmented reality marker based on augmented reality marker information stored in a storage device of the computing device;
- retrieve physical attribute information of the augmented reality marker stored in the storage device;
- retrieve location information of the augmented reality marker stored in the storage device;
- determine a distance between the computing device and the augmented reality marker based on the physical attribute information of the augmented reality marker, the physical attribute information comprising a first feature point of the augmented reality marker, a second feature point of the augmented reality marker, and a distance between the first and second feature points of the augmented reality marker;
- determine a location of the computing device based on the distance between the computing device and the augmented reality marker and the location information of the augmented reality marker; and
- display on the display a virtual marker indicating a direction of travel towards a desired destination indicated by the user based on the location of the computing device.

16. The at least one non-transitory computer-readable medium of claim 15, the computing device to dynamically update the display of the virtual marker indicating the direction of travel towards the desired destination indicated by the user as the user travels towards the desired destination.

17. The at least one non-transitory computer-readable medium of claim 15, the computing device to receive the physical attribute information of the augmented reality marker and the location information of the augmented reality marker from a remote computing device over a wireless local area network (LAN).

18. The at least one non-transitory computer-readable medium of claim 15, the location of the computing device to comprise a location of the computing device relative to physical dimensions of the occupied space of the user, the physical dimensions of the occupied space of the user stored in the storage device.

* * * * *